(12) United States Patent
Atluri et al.

(10) Patent No.: US 11,916,414 B2
(45) Date of Patent: Feb. 27, 2024

(54) APPARATUS AND METHOD FOR COORDINATING CONTACTOR-FUSE SYSTEM

(71) Applicant: GM GLOBAL TECHNOLOGY OPERATIONS LLC, Detroit, MI (US)

(72) Inventors: Venkata Prasad Atluri, Novi, MI (US); Suresh Gopalakrishnan, Troy, MI (US); Mark Daniel Gottlieb, West Bloomfield, MI (US); Madhusudan Raghavan, West Bloomfield, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 17/562,567

(22) Filed: Dec. 27, 2021

(65) Prior Publication Data
US 2023/0208159 A1 Jun. 29, 2023

(51) Int. Cl.
*H02J 7/00* (2006.01)

(52) U.S. Cl.
CPC ........ *H02J 7/00304* (2020.01); *H02J 7/0031* (2013.01); *H02J 7/00714* (2020.01)

(58) Field of Classification Search
CPC ... H02J 7/00304; H02J 7/0031; H02J 7/00714
USPC ....................................................... 361/102
See application file for complete search history.

(56) References Cited

U.S. PATENT DOCUMENTS

| | | | | |
|---|---|---|---|---|
| 2010/0127663 | A1* | 5/2010 | Furukawa | H02J 7/00304 320/134 |
| 2014/0307358 | A1* | 10/2014 | Duan | H02H 3/087 361/93.1 |
| 2016/0322837 | A1* | 11/2016 | Choi | H02J 3/466 |
| 2018/0248398 | A1* | 8/2018 | Pasqua | H02J 7/02 |
| 2019/0319448 | A1* | 10/2019 | Pevear | H02H 7/18 |

OTHER PUBLICATIONS

E. Honey, I.-S. Suh and S. R. Ryu, "Practical Considerations on the Electrical Safety of the High Power System in a Prototype EV," 2013 IEEE Vehicle Power and Propulsion Conference (VPPC), Beijing, China, 2013, pp. 1-6, doi: 10.1109/VPPC.2013.6671699 (Year: 2013).*

* cited by examiner

*Primary Examiner* — Thienvu V Tran
*Assistant Examiner* — Sreeya Sreevatsa

(57) ABSTRACT

A protection system for a battery system includes a battery control module configured to selectively open at least one contactor to isolate the battery system from a load in response to a sensed current being greater than a first threshold and within a first current range, at least one fuse connected between first and second terminals of the battery system and configured to open to isolate the battery system from the load in response to the sensed current being greater than a second threshold and within a second current range that is greater than and offset from the first current range, and an auxiliary protection module configured to selectively form a short circuit between first and second terminals in response to the sensed current being greater than the first threshold, less than the second threshold, and within a coverage gap region between the first and second current ranges.

20 Claims, 5 Drawing Sheets

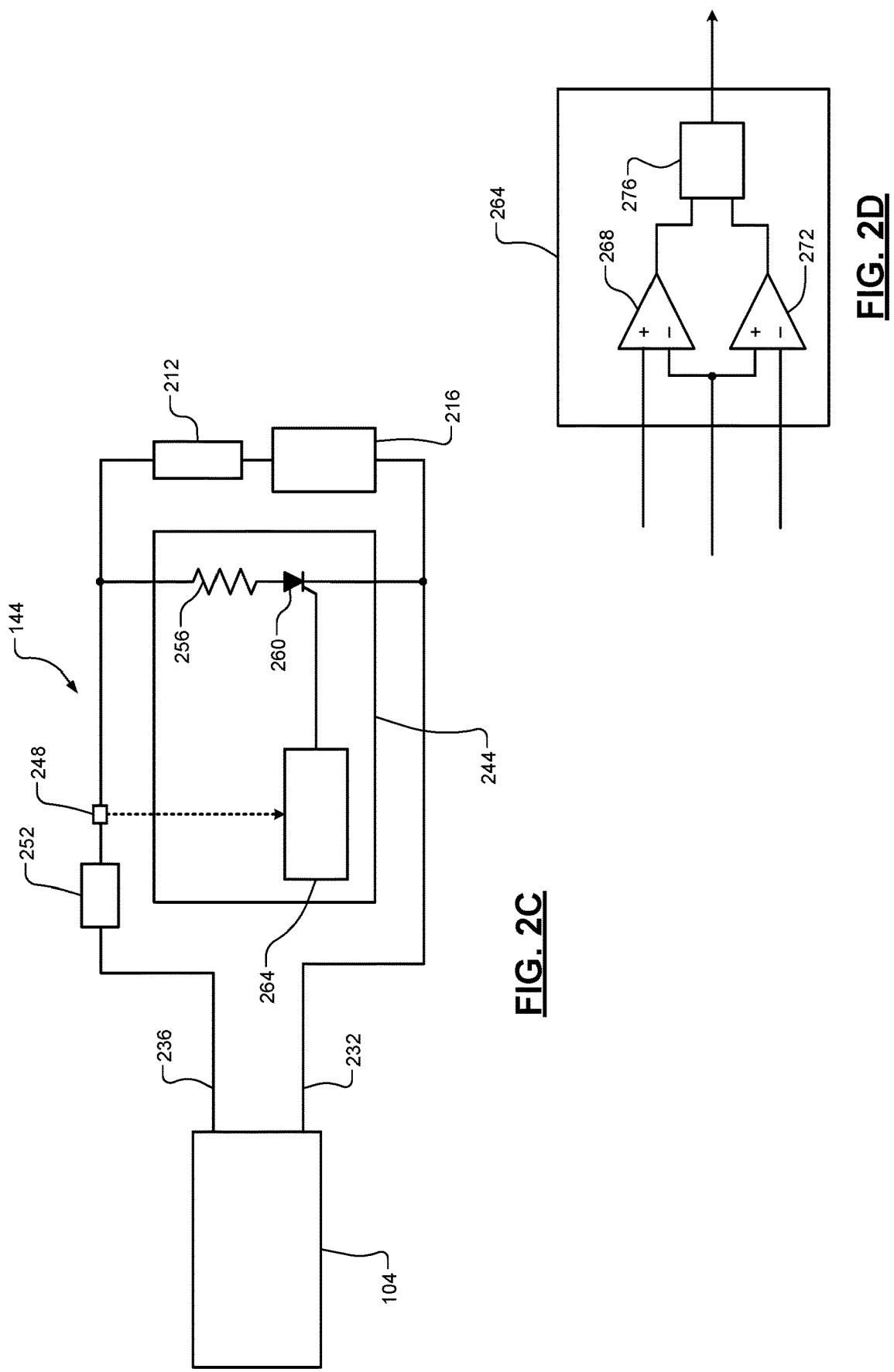

APPARATUS AND METHOD FOR COORDINATING CONTACTOR-FUSE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and, more particularly, to battery systems of vehicles.

Some types of vehicles include only an internal combustion engine that generates propulsion torque. Pure electric vehicles include a battery system and an electric motor. Hybrid vehicles include both an internal combustion engine and one or more electric motors and may include a battery system. The battery system includes one or more batteries or battery modules. Each battery module includes one or more battery cells.

SUMMARY

A protection system for a battery system arranged to provide power to a load includes a battery control module configured to selectively open at least one contactor to isolate the battery system from the load in response to a sensed current being greater than a first threshold and within a first current range, at least one fuse connected between a first terminal and a second terminal of the battery system and configured to open to isolate the battery system from the load in response to the sensed current being greater than a second threshold that is greater than the first threshold and within a second current range that is greater than and offset from the first current range, and an auxiliary protection module configured to selectively form a short circuit between the first terminal and the second terminal in response to the sensed current being greater than the first threshold, less than the second threshold, and within a coverage gap region between the first current range and the second current range.

In other features, the at least one contactor includes a first contactor connected to the first terminal and a second contactor connected to the second terminal.

In other features, the load comprises a plurality of loads.

In other features, the protection system further includes at least one current sensor, wherein the auxiliary protection module receives the sensed current from the at least one current sensor.

In other features, the auxiliary protection module is configured to selectively form the short circuit based on the sensed current, a current lower limit, and a current upper limit.

In other features, the current lower limit and the current upper limit correspond to the coverage gap region.

In other features, the current lower limit is greater than or equal to an upper end of the first current range.

In other features, the current upper limit is less than or equal to the second threshold.

In other features, the auxiliary protection module includes a gate control circuit and a switch, and the gate control circuit is configured to selectively close the switch to form the short circuit based on the sensed current, the current lower limit, and the current upper limit.

In other features, the switch is a silicon controlled rectifier and an output of the gate control circuit is connected to a gate of the silicon controlled rectifier.

In other features, the gate control circuit includes a first comparator that receives the sensed current and the current upper limit, a second comparator that receives the sensed current and the current lower limit, and an AND gate that receives outputs of the first comparator and the second comparator.

In other features, the auxiliary protection module includes a resistor connected in series with the switch.

In other features, a vehicle includes the protection system.

A method of operating protection system for a battery system arranged to provide power to a load includes selectively opening at least one contactor to isolate the battery system from the load in response to a sensed current being greater than a first threshold and within a first current range, selectively blowing at least one fuse connected between a first terminal and a second terminal of the battery system to isolate the battery system from the load in response to the sensed current being greater than a second threshold that is greater than the first threshold and within a second current range that is greater than and offset from the first current range, and selectively forming a short circuit between the first terminal and the second terminal in response to the sensed current being greater than the first threshold, less than the second threshold, and within a coverage gap region between the first current range and the second current range.

In other features, the method further includes selectively forming the short circuit based on the sensed current, a current lower limit, and a current upper limit.

In other features, the current lower limit and the current upper limit correspond to the coverage gap region.

In other features, the current lower limit is greater than or equal to an upper end of the first current range and the current upper limit is less than or equal to the second threshold.

In other features, the method further includes, to form the short circuit, controlling a switch based on the sensed current, the current lower limit, and the current upper limit.

In other features, the switch is a silicon controlled rectifier.

In other features, controlling the switch includes controlling the switch using a gate control circuit configured as a window comparator responsive to the sensed current, the current lower limit, and the current upper limit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2C shows an example auxiliary protection module according to the present disclosure;

FIG. 2D shows an example gate control circuit of the auxiliary protection module.

In the drawings, reference numbers may be reused to identify similar and/or identical elements.

DETAILED DESCRIPTION

Electric or hybrid electric vehicles typically include one or more rechargeable batteries or battery modules each including a plurality of battery cells (e.g., arranged in one or more battery packs). In some examples, an electric vehicle includes a high voltage (HV) battery pack configured to provide electrical power to a motor via an inverter. A protection system may be configured to selectively isolate the battery pack from other components of the vehicle, such as the inverter, a DC/DC converter, the motor, and other vehicle loads. For example, the protection system may include one or more contactors and one or more fuses each separately configured to isolate the battery pack in response to detecting a fault condition, such as a current spike.

In some examples, the contactors and fuses may have a coverage gap. For example, the contactors may be configured to be responsive to relatively lower sensed currents (e.g., currents that exceed a first threshold and are in a first current range) and have a relatively smaller (i.e., quicker) reaction time. The contactors may include two contactors configured to open synchronously in response to a sensed current exceeding the first threshold.

Conversely, the fuses may be configured to be responsive to relatively greater currents (e.g., currents that exceed a second threshold that is greater than the first threshold and the first current range and that are in a second current range). The second current range is greater than and spaced apart from the first current range. A gap between the first current range and the second current range corresponds to a coverage gap region. For example, in some conditions, one or more contactors may not open quickly enough in response to a current spike that (i) exceeds the first threshold and the first current range but (ii) does not yet exceed the second threshold. In other words, the current may increase in a manner that does not cause either the contactors or the fuses to open for a period in which the current is in the coverage gap region (e.g., a coverage gap period).

Battery management systems and methods according to the present disclosure implement a secondary or auxiliary protection module responsive to currents within the coverage gap region. For example, the auxiliary protection module is configured to detect currents in the coverage gap region and selectively trigger (e.g., open or blow) one or more of the fuses. In one example, the auxiliary protection module is configured to form a short circuit to trigger the fuse using crowbar circuitry (e.g., silicon controlled rectifier (SCR)-based crowbar circuitry). The auxiliary protection module is configured to be responsive specifically to currents within the coverage gap region.

Although described herein with respect to vehicle batteries (e.g., rechargeable batteries for electric or hybrid vehicles), the principles of the present disclosure may be applied to batteries used in non-vehicle applications.

Figure 1:
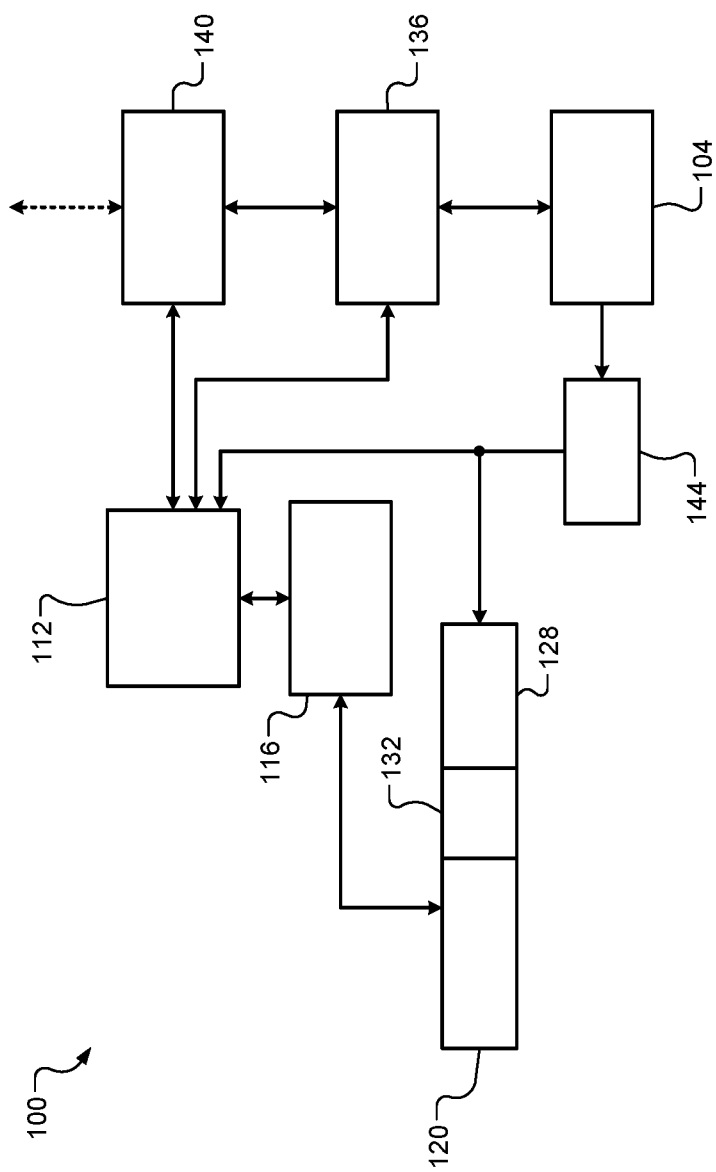
FIG. 1 is a functional block diagram of an example vehicle system according to the present disclosure.

Referring now to FIG. 1, a functional block diagram of an example vehicle system 100 including a battery pack or system 104 according to the present disclosure is shown. The vehicle system 100 may correspond to an autonomous or non-autonomous vehicle. The vehicle may be an electric vehicle (as shown). In other examples, the principles of the present disclosure may be implemented in a hybrid electric vehicle or a non-vehicle application.

A vehicle control module 112 controls various operations of the vehicle system 100 (e.g., acceleration, braking, etc.). The vehicle control module 112 may communicate with a transmission control module 116, for example, to coordinate gear shifts in a transmission 120. The vehicle control module 112 may communicate with the battery system 104, for example, to coordinate operation of an electric motor 128. While the example of one electric motor is provided, multiple electric motors may be implemented. The electric motor 128 may be a permanent magnet electric motor, an induction motor, or another suitable type of electric motor that outputs voltage based on back electromagnetic force (EMF) when free spinning, such as a direct current (DC) electric motor or a synchronous electric motor. In various implementations, various functions of the vehicle control module 112 and the transmission control module 116 may be integrated into one or more modules.

Electrical power is applied from the battery system 104 to the electric motor 128 to cause the electric motor 128 to output positive torque. For example, the vehicle control module 112 may include an inverter or inverter module (not shown) to apply the electrical power from the battery system 104 to the electric motor 128. The electric motor 128 may output torque, for example, to an input shaft of the transmission 120, to an output shaft of the transmission 120, or to another component. A clutch 132 may be implemented to couple the electric motor 128 to the transmission 120 and to decouple the electric motor 128 from the transmission 120. One or more gearing devices may be implemented between an output of the electric motor 128 and an input of the transmission 120 to provide one or more predetermined gear ratios between rotation of the electric motor 128 and rotation of the input of the transmission 120.

A battery control module (comprising, for example, a vehicle or battery management system) 136 is configured to control functions of the battery system 104 including, but not limited to, controlling switching of individual battery modules or cells of the battery system 104, monitoring operating parameters, diagnosing faults, etc. The battery control module 136 may be further configured to communicate with a telematics module 140.

A protection system 144 is provided between the battery system 104 and the motor 128 and other loads (not shown in FIG. 1) of the vehicle system 100. The protection system 144 is configured to selectively isolate the battery system 104 from the motor 128 and other loads. For example, the protection system 144 includes one or more contactors (e.g., response to the battery control module 136), one or more fuses, etc. each configured to isolate or disconnect the battery system 104 in response the detection of a fault condition, such as detection of a current output from the battery system 104 exceeding a predetermined threshold. The protection system 144 according to the present disclosure is further configured to detect and be responsive to (e.g., using an auxiliary protection module, or APM) a current in a coverage gap region between the contactors and the fuses.

Figure 2A:
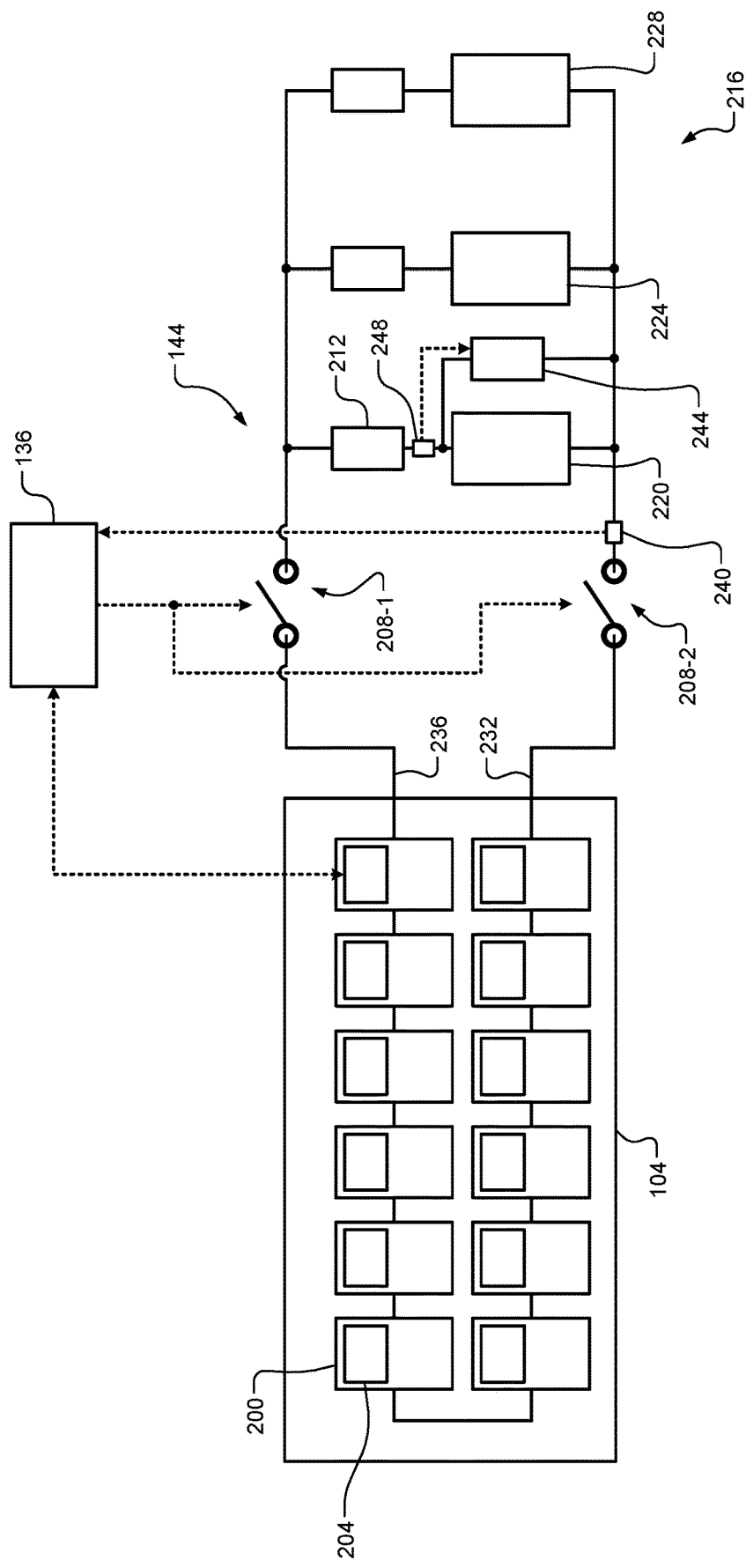
FIGS. 2A and 2B are functional block diagrams of an example battery system and protection system according to the present disclosure.
Figure 2B:
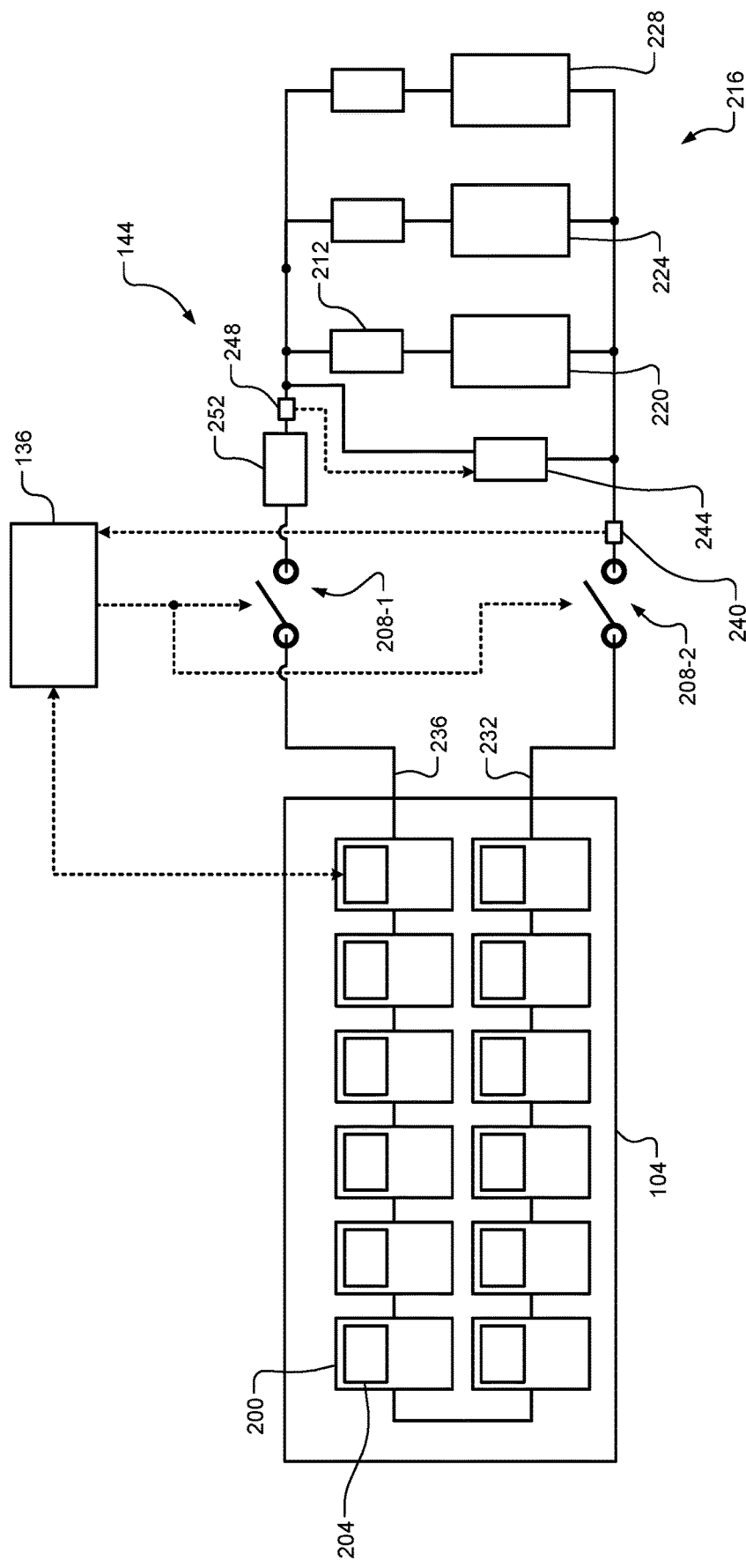

FIGS. 2A and 2B show an example implementation of the battery system 104, the battery control module 136, and the protection system 144 according to the present disclosure. The battery system 104 includes a plurality of battery modules 200. In some examples, each of the battery modules 200 may be comprised of a plurality of individual battery cells.

Each of the battery modules 200 may include a respective management module (MM) 204. Each of the management modules 204 is configured to monitor operating characteristics (e.g., voltage, current, temperature, etc.) of a corresponding one of the battery modules 200. The management modules 204 communicate (e.g., via a wireless communication interface) data indicating the monitored operating characteristics to the battery control module 136. In some examples, the management modules 204 communicate with a master management module (not shown), which in turn communicates with the battery control module 136.

The protection system 144 includes contactors 208 (e.g., first and second contactors 208-1 and 208-2, respectively) and one or more fuses 212. When the contactors 208 are closed, current from the battery system 104 is supplied to loads 216 such as one or more motor generator units (MGUs) 220, a DC/DC converter 224, and/or other loads 228. For example, the battery control module 136 controls the opening and closing of the contactors 208.

In one example, the battery control module 136 is configured to open the contactors 208 to isolate the battery system 104 from the loads 216 in response to a sensed current that exceeds a first threshold and is in a first current range. For example, the sensed current corresponds to a current flowing from a first terminal 232 of the battery system 104, through the contactor 208-1, the loads 216, and the contactor 208-2, to a second terminal 236 of the battery system 104 and sensed by a first current sensor 240. Conversely, the fuses 212 are configured to open (i.e., blow) in response to the current flowing from the battery system 104 that exceeds a second threshold that is greater than the first threshold and is in a second current range.

An auxiliary protection module (APM) 244 according to the present disclosure is configured to disconnect the battery system 104 in response to sensed currents in a coverage gap region between the first current range and the second current range. In other words, the APM 244 is responsive to current that is greater than the first threshold and the first current range but is not greater than the second threshold. For example, as shown, the APM 244 is connected between the first terminal 232 and the second terminal 236 (e.g., in parallel with the loads 216 and in series with one or more of the fuses 212). A second current sensor 248 senses current flowing between the first terminal 232 and the second terminal 236 and through one or more of the loads 216 and respective fuses 212. As shown in FIG. 2B, the APM 244 and the second current sensor 248 are connected to a main fuse 252 connected between the loads 216 and the second terminal 236.

The APM 244 is configured to selectively form a short circuit between the first terminal 232 and the second terminal 236 to blow one or more of the fuses 212 (or the main fuse 252 in FIG. 2B) in response to the current sensed by the second current sensor 248 being within the coverage gap region. For example, the APM 244 includes crowbar circuitry (e.g., silicon controlled rectifier (SCR)-based crowbar circuitry) that forms the short circuit. Although shown in FIG. 2A connected only to the fuse 212 corresponding to the MGU 220, the APM 244 may be connected to multiple fuses 212, two or more of the APMs 244 may be connected to respective ones of the fuses 212, etc.

FIG. 2C shows an example of the APM 244 in more detail. The APM 244 includes a crowbar resistor ($R_{crowbar}$) 256 connected in series with a semiconductor switch 260 between the first terminal 232 and the second terminal 236. The second current sensor 248 and the main fuse 252 are connected in series between the crowbar resistor 256 and the second terminal 236. The crowbar resistor 256 is configured to function as a current limiting resistor to limit the current through the main fuse 252. In other words, when the APM 244 closes the switch 260 to form the short circuit between the first terminal 232 and the second terminal 236, the crowbar resistor 256 is configured to lower an overall resistance between the first terminal 232 and the second terminal 236 and flow sufficient current to blow the main fuse 252 without exceeding a desired current limit. In other examples, the switch 260 may be configured to limit current and the crowbar resistor 256 can be omitted.

As shown, the switch 260 is a silicon controlled rectifier (SCR), but other suitable switches may be used. In this example, the current sensed by the second current sensor 248 is provided to a gate control circuit 264. An output of the gate control circuit 264 (e.g., a gate control signal) is provided to a gate of the switch 260. The gate control circuit 264 is configured to close the switch 260 (i.e., form the short circuit) in response to the sensed current being within a predetermined current range corresponding to the coverage gap region.

FIG. 2D shows an example implementation of the gate control circuit 264. In this example, the gate control circuit 264 is configured as a window comparator. The gate control circuit 264 includes a first comparator 268, a second comparator 272, and an AND gate 276. The first comparator 268 receives the current sensed by the second current sensor 248 ($I_{sense}$) and a current upper limit ($I_{upper}$) (e.g., at an inverting terminal and a non-inverting terminal, respectively). The second comparator 272 receives the current sensed by the second current sensor 248 and a current lower limit ($I_{lower}$) (e.g., at a non-inverting terminal and an inverting terminal, respectively). The AND gate 276 outputs the gate control signal based on outputs of the first comparator 268 and the second comparator 272.

The current lower limit and the current upper limit correspond to lower and upper limits of the coverage gap region. For example, the current lower limit is selected to be above any potential output current of the battery system 104 during normal (i.e., non-fault) operation. As one example, the current lower limit is above the first threshold at which the contactors 208 are configured to open and above the first current range covered by the contactors 208. For example, the current lower limit is located at or above the upper end of the first current range. Conversely, the current upper limit is selected to be below the second current range in which the main fuse 252 (and/or the fuses 212) are configured to open. For example, the current upper limit is less than or equal to the second threshold at which the fuses 212 and/or the main fuse 252 are configured to open.

Accordingly, the gate control circuit 264 is configured to close the switch 260 to form the short circuit only when the sensed current is within the coverage gap region. In other words, when the sensed current is greater than the first threshold and less than the current lower limit (i.e., within the first current range), the gate control circuit 264 does not control the switch 260 to form the short circuit and instead allows the contactors 208 to open to disconnect the battery system 104. Conversely, when the sensed current is greater than the current upper limit and the second threshold (i.e., within the second current range), the gate control circuit 264 allows the fuses 212 and/or the main fuse 252 to blow to disconnect the battery system 104.

Figure 3:
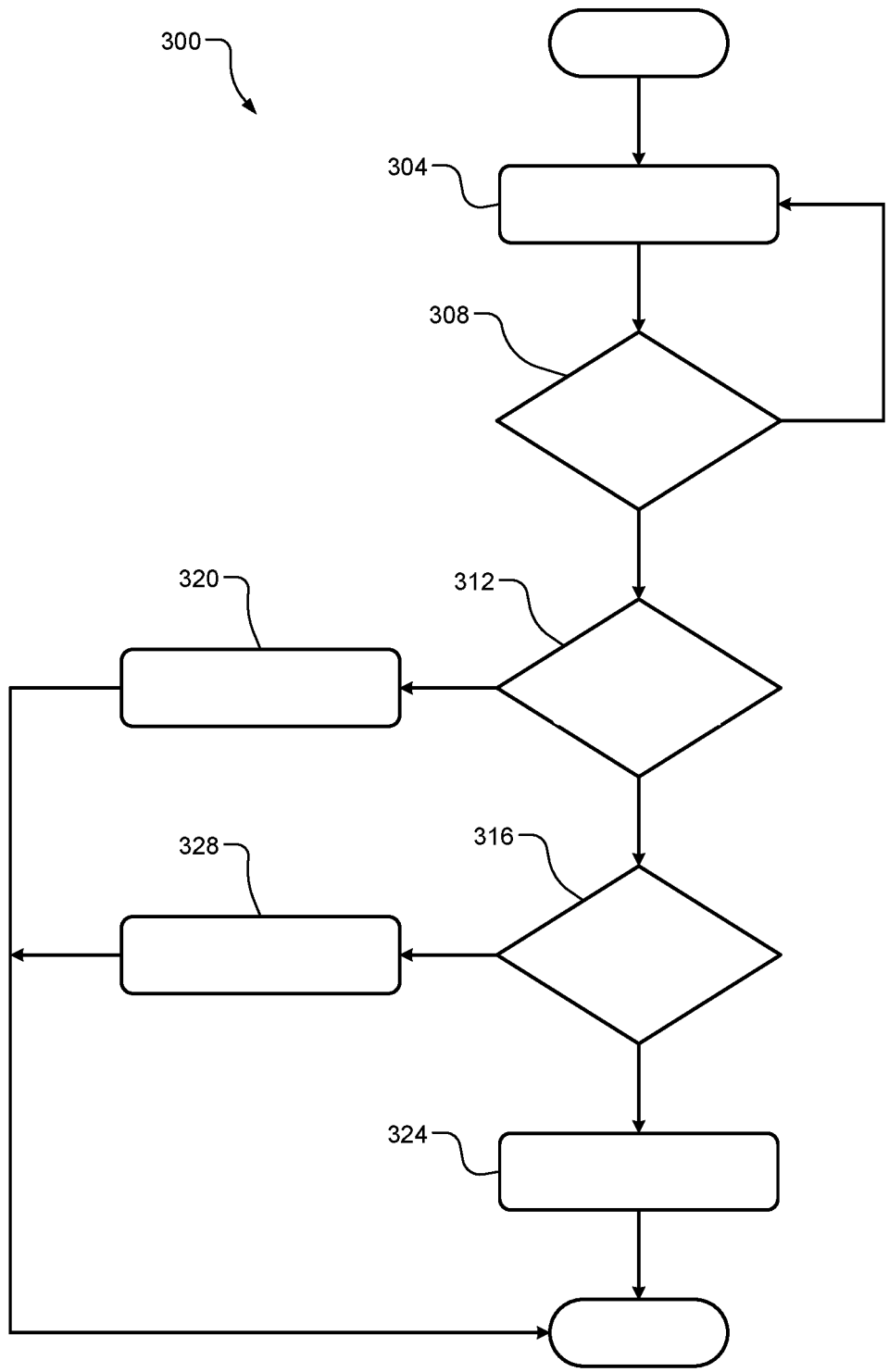
FIG. 3 illustrates steps of an example method of operating the auxiliary protection module.

FIG. 3 shows an example method 300 of operating the protection system 144. At 304, the method 300 (e.g., the second current sensor 248) senses the current output by the battery system and flowing between the first terminal 232 and the second terminal 236. At 308, the method 300 (e.g., the battery control module 136 and/or the APM 244) determines whether the sensed current is greater than the first threshold. If true, the method continues to 312. If false, the method 300 continues to 304.

At 312, the method 300 (e.g., the battery control module 136 and/or the APM 244) determines whether the sensed current is outside of (i.e., greater than) the first current range. For example, the method 300 determines whether the sensed current is greater than the current lower limit of the APM 244 and therefore outside of the first current range of the contactors 208. If true, the method 300 continues to 316. If false, the method 300 continues to 320. At 320, the method 300 (e.g., the battery control module 136 opens the contactors to isolate the battery system 104 from the loads 216.

At 316, the method 300 (e.g., the APM 244) determines whether the sensed current is greater than the current upper limit. In other words, the method 300 determines whether the sensed current is within the coverage gap region outside of (i.e., lower than) the second current range of the fuses (e.g., the fuses 212 and/or the main fuse 252). If the sensed current is greater than the current upper limit, the method 300 continues to 324. If false, the method 300 continues to 328. At 328, the method 300 (e.g., the APM 244) forms a short circuit across the first terminal 232 and the second terminal 236. For example, the APM 244 operates the switch 260 to allow sufficient current to blow the main fuse 252 to flow between the first terminal 232 and the second terminal 236.

At 324, the method 300 allows the main fuse 252 (and/or the fuses 212) to blow without closing the switch 260 to form the short circuit. In other words, since the sensed current is within the second current range (i.e., a coverage region of the fuses), the fuses are triggered to isolate the battery system 104 from the loads 216.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A protection system for a battery system arranged to provide power to a load, the protection system comprising:
    a battery control module configured to selectively open at least one contactor to isolate the battery system from the load in response to a sensed current being (i) greater than a first threshold and (ii) within a first current range;
    at least one fuse connected between a first terminal and a second terminal of the battery system, wherein the at least one fuse is configured to open to isolate the battery system from the load in response to the sensed current being (i) greater than a second threshold that is greater than the first threshold and (ii) within a second current range that is greater than and offset from the first current range; and
    an auxiliary protection module configured to selectively form a short circuit between the first terminal and the second terminal in response to the sensed current being (i) greater than the first threshold, (ii) less than the second threshold, and (iii) within a coverage gap region between the first current range and the second current range.

2. The protection system of claim 1, wherein the at least one contactor includes a first contactor connected to the first terminal and a second contactor connected to the second terminal.

3. The protection system of claim 1, wherein the load comprises a plurality of loads.

4. The protection system of claim 1, further comprising at least one current sensor, wherein the auxiliary protection module receives the sensed current from the at least one current sensor.

5. The protection system of claim 4, wherein the auxiliary protection module is configured to selectively form the short circuit based on the sensed current, a current lower limit, and a current upper limit.

6. The protection system of claim 5, wherein the current lower limit and the current upper limit correspond to the coverage gap region.

7. The protection system of claim 6, wherein the current lower limit is greater than or equal to an upper end of the first current range.

8. The protection system of claim 6, wherein the current upper limit is less than or equal to the second threshold.

9. The protection system of claim 4, wherein the auxiliary protection module includes a gate control circuit and a switch, and wherein the gate control circuit is configured to selectively close the switch to form the short circuit based on the sensed current, the current lower limit, and the current upper limit.

10. The protection system of claim 9, wherein the switch is a silicon controlled rectifier and an output of the gate control circuit is connected to a gate of the silicon controlled rectifier.

11. The protection system of claim 9, wherein the gate control circuit includes a first comparator that receives the sensed current and the current upper limit, a second comparator that receives the sensed current and the current lower limit, and an AND gate that receives outputs of the first comparator and the second comparator.

12. The protection system of claim 9, wherein the auxiliary protection module includes a resistor connected in series with the switch.

13. A vehicle comprising the protection system of claim 1.

14. A method of operating protection system for a battery system arranged to provide power to a load, the method comprising:
    selectively opening at least one contactor to isolate the battery system from the load in response to a sensed current being (i) greater than a first threshold and (ii) within a first current range;
    selectively blowing at least one fuse connected between a first terminal and a second terminal of the battery system to isolate the battery system from the load in response to the sensed current being (i) greater than a second threshold that is greater than the first threshold and (ii) within a second current range that is greater than and offset from the first current range; and
    selectively forming a short circuit between the first terminal and the second terminal in response to the sensed current being (i) greater than the first threshold, (ii) less than the second threshold, and (iii) within a coverage gap region between the first current range and the second current range.

15. The method of claim 14, further comprising selectively forming the short circuit based on the sensed current, a current lower limit, and a current upper limit.

16. The method of claim 15, wherein the current lower limit and the current upper limit correspond to the coverage gap region.

17. The method of claim 16, wherein the current lower limit is greater than or equal to an upper end of the first current range and the current upper limit is less than or equal to the second threshold.

18. The method of claim 16, further comprising, to form the short circuit, controlling a switch based on the sensed current, the current lower limit, and the current upper limit.

19. The method of claim 18, wherein the switch is a silicon controlled rectifier.

20. The method of claim 19, wherein controlling the switch includes controlling the switch using a gate control circuit configured as a window comparator responsive to the sensed current, the current lower limit, and the current upper limit.

\* \* \* \* \*